J. H. DATER.
Combined Mowing Machine and Hay Tedder.
No. 100,124. Patented Feb. 22, 1870.
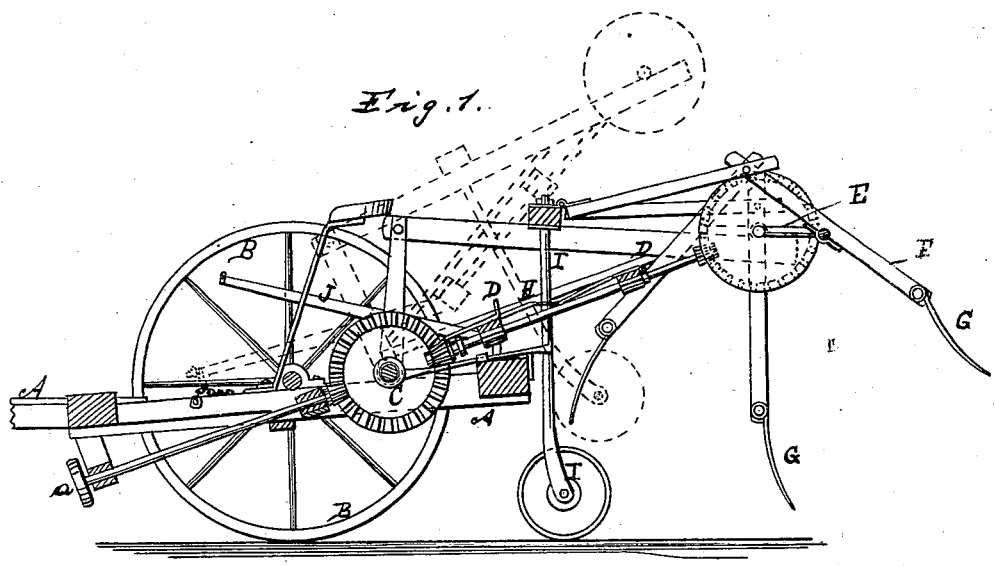
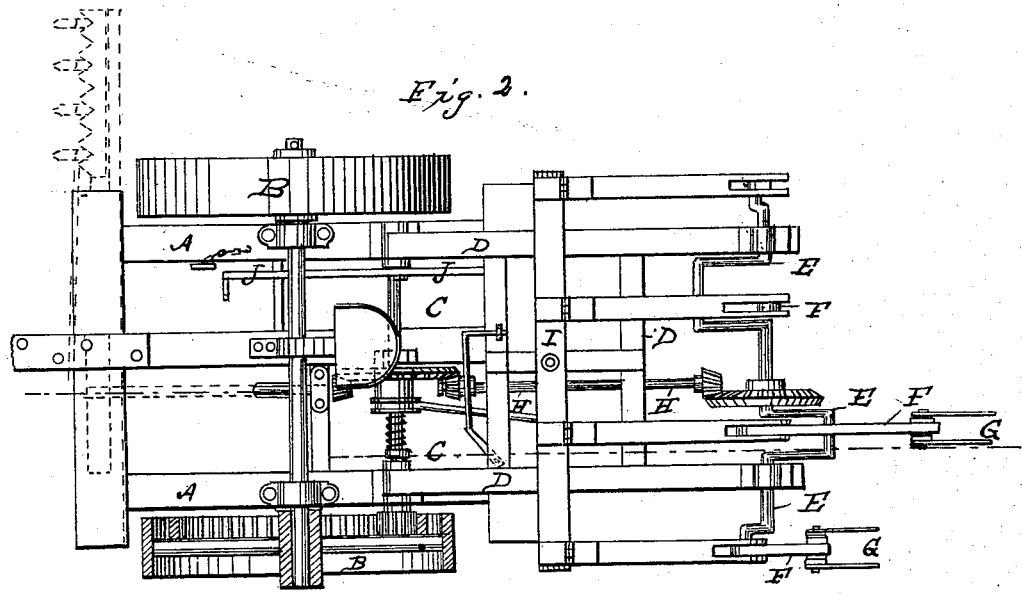
Witnesses
Inventor

United States Patent Office.

J. H. DATER, OF EAGLE MILLS, NEW YORK.

Letters Patent No. 100,124, dated February 22, 1870.

---

IMPROVEMENT IN COMBINED MOWING-MACHINE AND HAY-TEDDER.

---

The Schedule referred to in these Letters Patent and making part of the same.

---

*To all whom it may concern:*

Be it known that I, J. H. DATER, of Eagle Mills, in the county of Rensselaer, and State of New York, have invented a new and Improved Combined Mowing-Machine and Hay-Spreader; and I do hereby declare that the following is a full, clear, and exact description thereof, which will enable others skilled in the art to make and use the same, reference being had to the accompanying drawings forming part of this specification, in which—

Figure 1 represents a vertical longitudinal section of my combined mowing-machine and hay-spreader.

Figure 2 is a plan or top view of the same.

Similar letters of reference indicate corresponding parts.

This invention relates to an improvement of mowing-machines, whereby they are made to spread and disturb the grass mowed by them.

The invention consists in the combination and arrangement of parts, as will be hereinafter fully described.

A, in the drawing, represents the frame of a mowing-machine of suitable construction.

B B are the wheels by which the same is supported.

C is the shaft by which motion is imparted to the pitman-wheel $a$, or its equivalent, for moving the cutter-bar.

To the rear of the frame A is pivoted, by a separate pin, or by the shaft C, or otherwise, a frame, D, which contains the hay-spreading apparatus.

The said apparatus consists either of a revolving crank-shaft, E, and swinging arms F, which have the tines G, or of other suitable devices adapted to the successful spreading of the hay which has been cut by the mowing-machine.

The spreading machinery is set in motion by a shaft, H, or belt which is moved by the apparatus on the mowing-machine; such shaft or belt can be thrown out of gear whenever desired.

The frame D of the hay-spreader is supported by a caster-wheel, I, which allows it to follow the motion of the front frame. The frame D can be swung up as indicated by dotted lines in fig. 1, for the purpose of raising the spreader off the ground.

For this purpose a lever, J, is provided on the frame D, and can be locked to the frame A.

The hay-spreader can, whenever desired, be entirely removed from the mowing-machine to let each apparatus, or any one, be used separately.

Having thus described my invention,

I claim as new and desire to secure by Letters Patent—

1. The driving-shaft C of the cutter-bar, and a suitable frame D, in combination with the shaft H, crank-shaft E, and intermediate gearing, all arranged as described, on a mower.

2. A swinging frame D, spreader F G, and the shafts and gear-wheels above described, all arranged as and for the purpose specified.

J. H. DATER.

Witnesses:
GEO. W. MABEE,
ALEX. F. ROBERTS.